United States Patent [19]
Johnson et al.

[11] 4,427,426
[45] Jan. 24, 1984

[54] OZONIZER SYSTEM

[76] Inventors: Ronald G. Johnson, 1016 Murchison Dr., Millbrae, Calif. 94030; Monte D. Barber, 5330 Tioago La., Diamond Springs, Calif. 95679

[21] Appl. No.: 393,039

[22] Filed: Jun. 28, 1982

[51] Int. Cl.³ .................... B01D 53/02; C02B 3/08
[52] U.S. Cl. ........................ 55/162; 55/208; 55/DIG. 17; 204/286; 210/192
[58] Field of Search .............. 210/760, 192; 55/DIG. 17, 28, 33, 150, 208, 162, 148; 204/176, 286

[56] References Cited
U.S. PATENT DOCUMENTS

| | | | |
|---|---|---|---|
| 2,584,889 | 2/1952 | Latour | 55/DIG. 17 |
| 2,660,559 | 11/1953 | Prime | 210/760 |
| 3,336,099 | 8/1967 | Czulak et al. | 210/760 X |
| 4,019,983 | 4/1977 | Mandt | 210/760 |
| 4,141,830 | 2/1979 | Last | 210/760 |

*Primary Examiner*—John Adee
*Attorney, Agent, or Firm*—Edward B. Gregg

[57] ABSTRACT

Ozonizer and water purifier. The ozonizer comprises at least one, preferably two or more, units each having an inner, rod-like electrode and an outer tubular electrode and a glass tube carrying the outer electrode. End plates are provided which are formed with sockets. Each inner electrode is seated in a pair of sockets with its ends abutting the closed ends of the sockets and clamped thereto by screws. The glass tube has its ends abutting shoulders in the sockets. A drier is provided for drying the air to be ozonized. Periodically hot air is passed through the drier to dry the dessicant material. Ambient air is sucked through the drier by a venturi device which also serves to mix ozonized air with the water to be purified.

5 Claims, 5 Drawing Figures

OZONIZER SYSTEM

This invention relates to apparatus and a system for ozonizing air and for purifying water by means of ozonized air.

It is common practice to purify water for industrial and domestic use by subjecting it to treatment with ozonized air. By "ozonized air" is meant air in which a small quantity, for example, 1 to 2 percent of ozone is incorporated. Among the advantages of water purification by means of an ozone are the fact that no harmful end products or by-products result. Also, an ozonizing system lends itself to an automatic, cyclic treatment.

However, certain difficulties have been encountered in connection with ozonizing systems. A common type of ozonizer relies upon a corona discharge in the annular space between an inner metal rod and an outer aluminum tube, usually with the interposition of a glass tube between the outer tube and the inner rod. It is important that the annular space be uniform.

It is an object of the present invention to provide improvements in ozonizing systems and water purification systems employing ozone.

It is a particular object of the invention to provide an ozonizer for such purpose in which the mounting of the inner electrode in the form of a rod is exactly centered in relation to the outer electrode in the form of a tube such that the annular space between the electrodes, i.e. the gap between the electrodes is uniform.

It is another object of the invention to provide a system in which air drawn into the ozonizer is dried by means of a drier assembly which can be operated cyclically and which from time to time will automatically dry the dessicating material employed for the purpose of drying air.

The above and other objects of the invention will be apparent from the ensuing description and the appended claims.

One embodiment of the invention is shown by way of example in the accompanying drawings in which.

Figure 1:
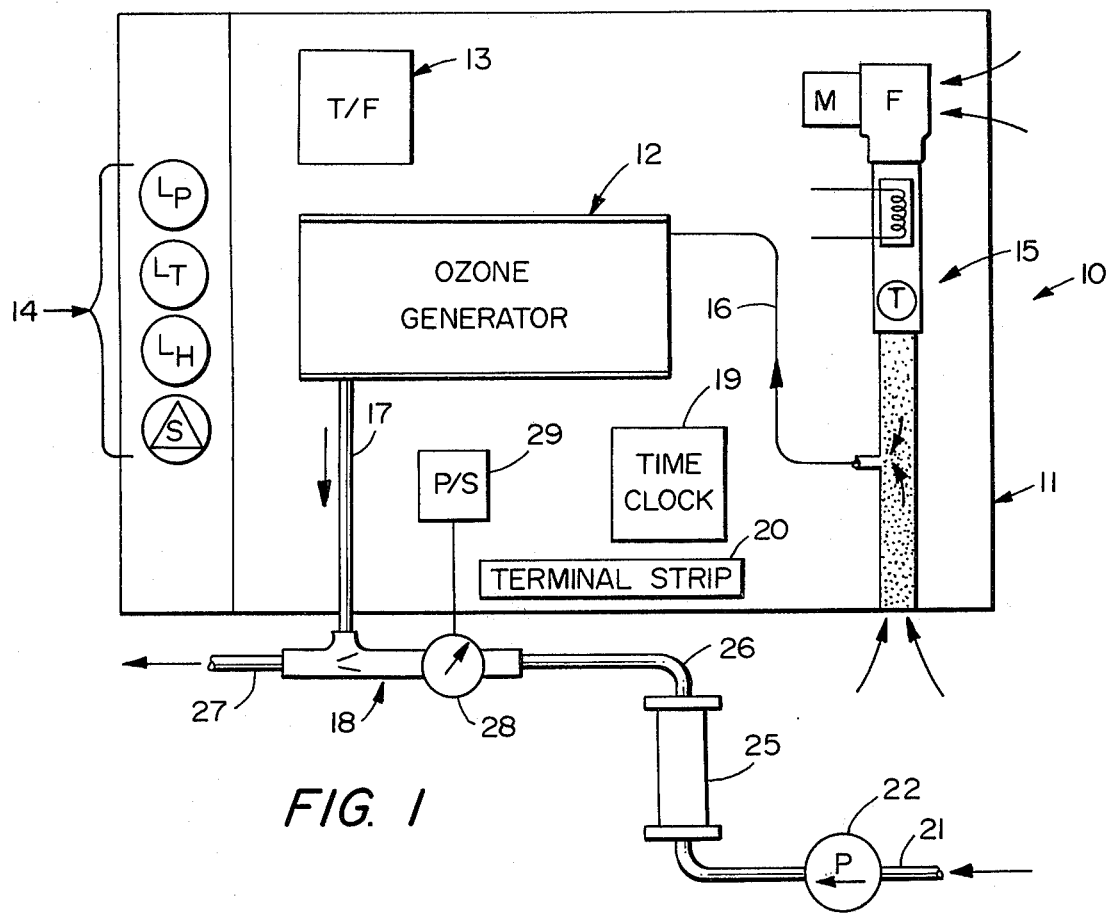
FIG. 1 is a diagrammatic overall view of the system of the present invention.

Referring now to FIG. 1, the ozonizer system is generally indicated by the reference numeral 10 and is shown mounted on a frame 11. It incorporates an ozonizer 12 and a transformer 13 for stepping up the house voltage to the desired value, such also incorporating a rectifier so that a direct current voltage is provided. Also shown are signal lights 14 to indicate the state of the system at any given time. A dryer unit 15 is shown connected by a tube 16 to the ozonizer 12. The ozonizer has an outlet tube 17 through which ozonized air flows to a mixing unit which is shown at 18. A time clock 19 and a terminal strip 20 are also shown. A water intake pipe is shown at 21 and a pump at 22 which pumps the water through a filter 25, then through a tube 26 to the mixing unit 18. An outlet pipe 27 is shown through which the purified water flows to a storage tank or such other use as is made of it. A valve is shown at 28 controlled by a pressure switch 29 which operates, in the event that water pressure fails, to shut down the entire system.

Figure 2:
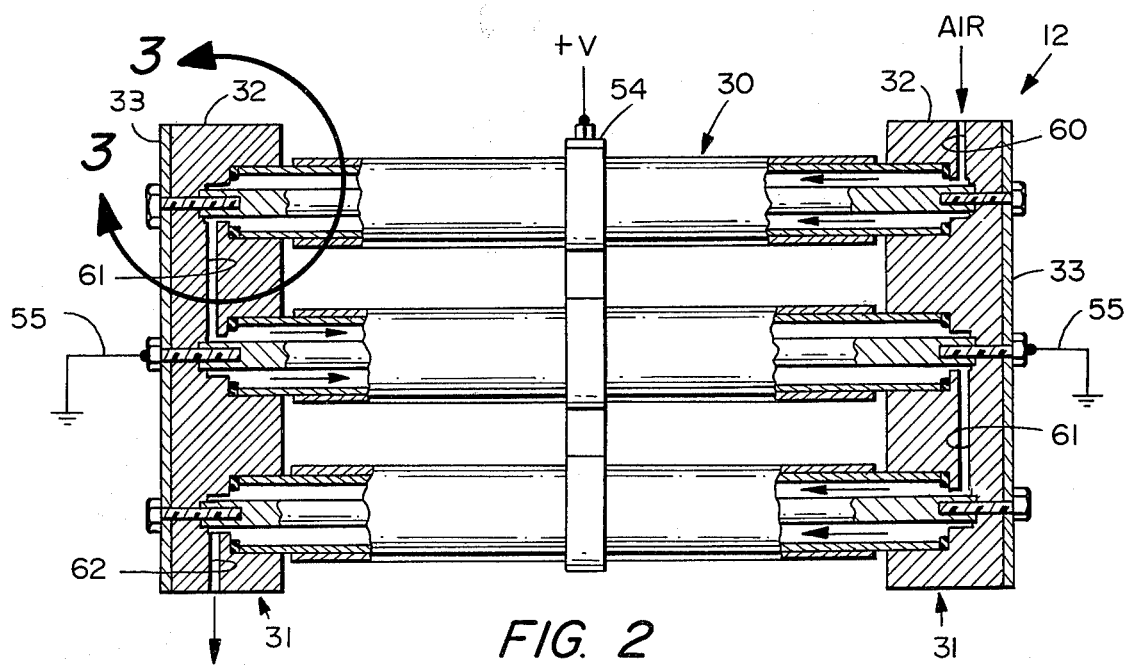
FIG. 2 is a detailed view of the ozonizer which is shown partly in side elevation and partly in section.
Figure 3:
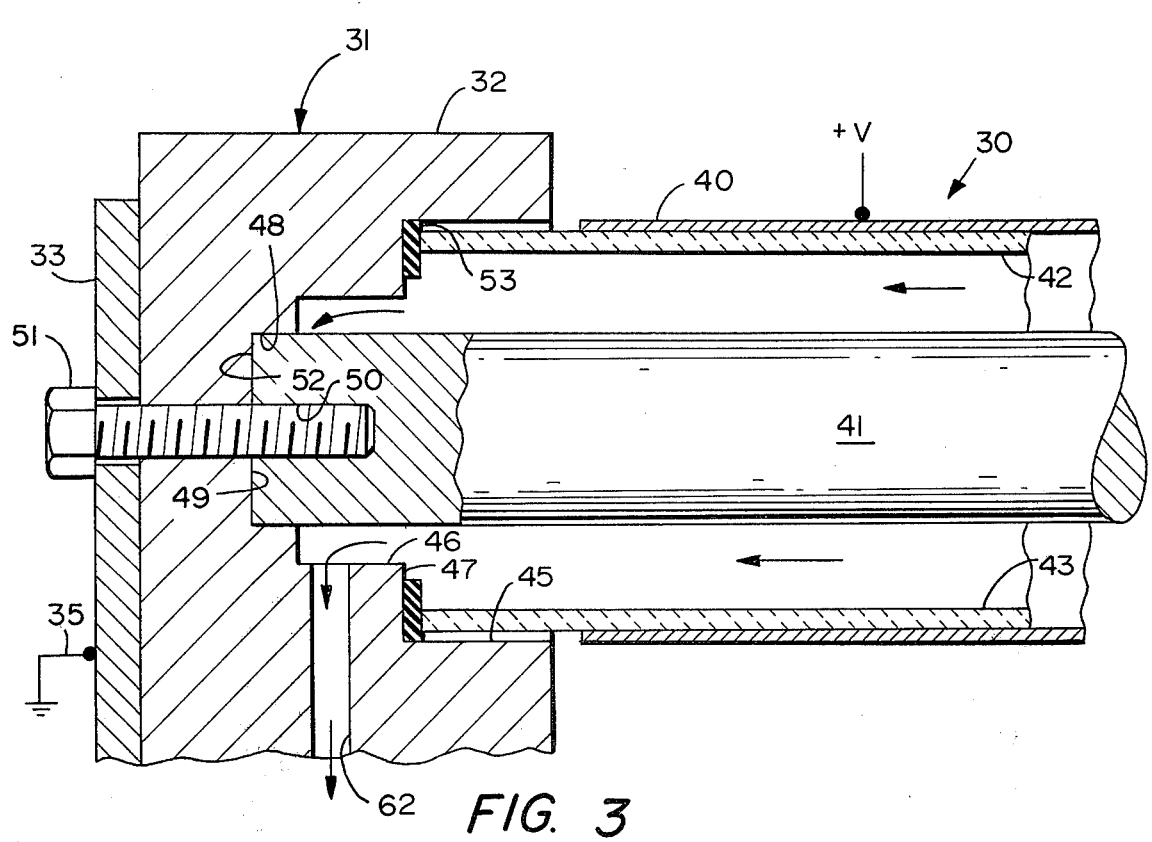
FIG. 3 is a view of an end portion of one of the ozonizer units of FIG. 2 shown on a larger scale than that of FIG. 2 and showing the means whereby the inner electrode is precisely centered in relation to the outer electrode.

Referring now to FIGS. 2 and 3, the ozonizer 12 comprises ozonizer sub-units 30, three such being shown. A greater or lesser number may be used as is desired or as is convenient or called for by the circumstances. End members 31 are shown, each comprising a plastic mounting member 32 and a metal plate 33.

Referring more particularly to FIG. 3, each of the ozonizer units 30 comprises an outer tubular electrode 40 conveniently made of aluminum, an inner electrode 41 conveniently in the form of a stainless steed rod, and a glass tube 42. It is important that the annular space, indicated at 43, between the glass tube 42 and the rod 41 be maintained uniform so that the corona discharge between the two elecrodes will be uniform.

The end member 32 is conveniently made of ozone resistant material such as Teflon and it is formed with sockets as shown. These include an open end cavity 45, a passage 46 separated from the cavity 45 by a planar shoulder 47, and an inner, closed end socket 48 having a closed planar end 49. Each end of each electrode 41 is seated in a socket 48 and is bored and threaded at 50 to receive a screw 51 which extends through the respective plate 33 and mounting member 32. Upon tightening the screws 51 the planar ends 52 of the rod 41 will be drawn against the surfaces 49 and will be accurately centered, such that the annular space 43 is uniform.

Annular washers 53 of suitable ozone resistant material such as Teflon are provided which are held against shoulder 47. As will be seen, the ends of glass tube 42 are held against washers 53.

By this means it will be apparent that the electrodes 40 and 41 will be very accurately positioned so that the annular space 43 is of uniform dimensions. A metallic strip 54 (see FIG. 2) and ground connections 55 to plates 33 and rods 41 provided electrical connections to the transformer 13.

A circuitous air/ozone passageway is provided by an entry passage 60 (see FIG. 2), the annular spaces 43, connecting passages 61 and outlet passages 62 to conduit 17.

Figure 4:
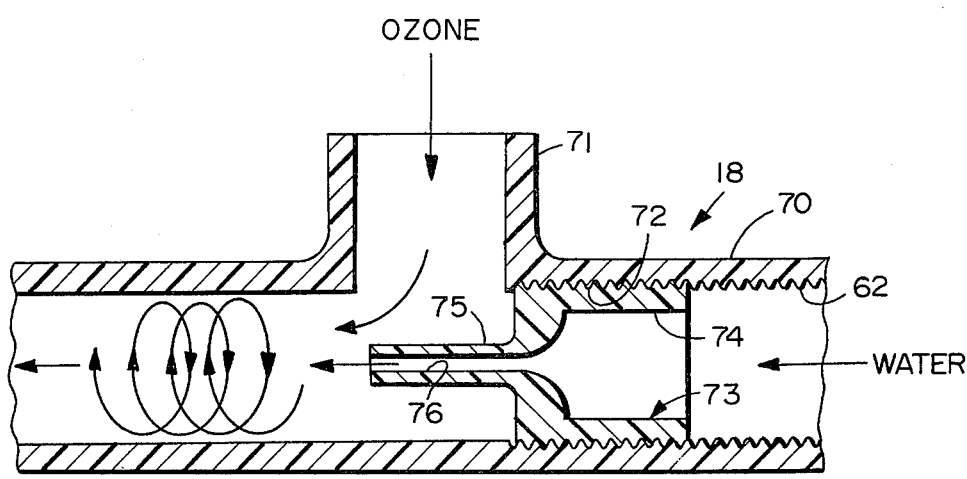
FIG. 4 is a view in vertical section of the mixing mechanism employed to mix ozonized air with water and to draw air into the ozonizer.

Referring now to FIG. 4, the mixing unit 18 comprises a tube 70 provided with an inlet branch 71 and threaded at 72. A venturi insert 73 is threaded into tube 70 and it has an inlet portion 74 and an outlet tube 75 providing a venturi passage 76. As indicated by the arrows, suction created by the venturi insert 63 will cause ozonized air to be drawn into the tube and mixed with water.

Figure 5:
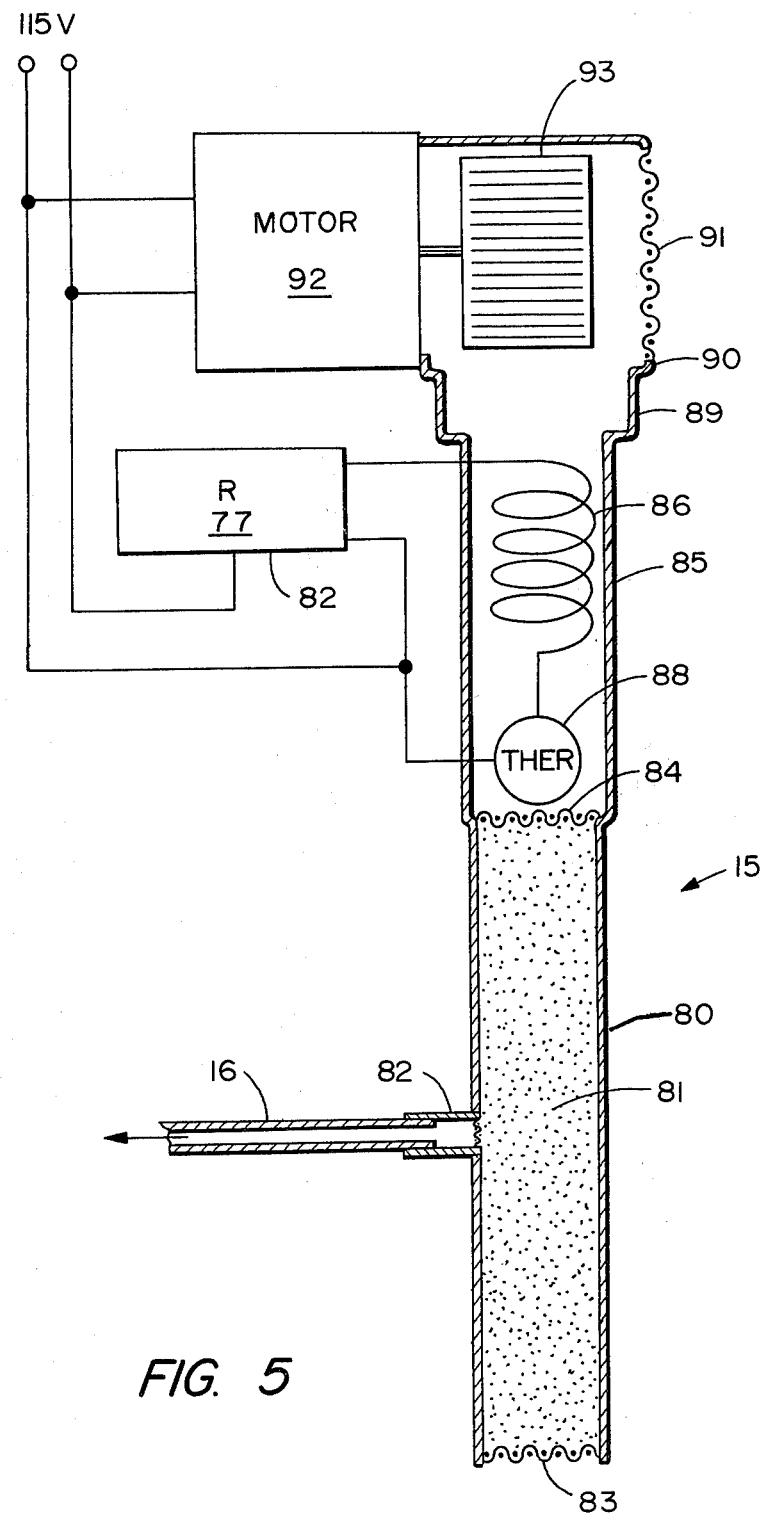
FIG. 5 is a view in vertical section of a drying unit to dry the air drawn into the ozonizer.

Referring now to FIG. 5, the drying unit 15 comprises a tube 80 filled with a drying agent 81 such as silica gel. An outlet is provided at 82 connected to the line 16, such outlet being approximately half way between the upper end and the lower end of the tube 80. The ends of the tube are fitted with screens 83 and 84. To the upper end of the tube 80, another tube 85 is attached in which there is a heating coil 86 operated by an electrical unit 87. A thermostat 78 is provided to regulate the temperature of the air passing downwardly through the tube 85 into the tube 80. A housing 89 is provided at the upper end of the tube 75 which has an inlet at 90 covered by a screen 91. A motor 92 operates a fan 93.

During operation air is drawn into the dryer tube 80 by suction of the venturi device 18 and is dried before being introduced into the ozonizer. From time to time hot air is blown through the dryer tube 80 and leaves at the bottom end 73 to accomplish regneration of the drying material.

The time clock 19 through a conventional circuit (not shown) controls the cycle of the apparatus. At the start of a cycle the pump 21 commences operation; the venturi effect of the venturi device 28 creates a suction which draws air in through inlet 91; air is dried by drier 81 and passes through ozonizer 12; mixture of ozonized air and water occurs in venturi device 18. At an appropriate time time clock 19 shuts off pump 22 and starts motor 92 and heater coil 86. Hot air is passed through dessicant material and passes out through screen 83. Then the cycle is started anew.

It will therefore be apparent that a novel and advantageous apparatus, system and method for ozonizing air and for treating water with ozonized air have been provided.

What is claimed is:

1. An ozonizer unit comprising:
   (a) a pair of end members, each formed with a socket configured to present an inner planar face, an open end and a planar shoulder parallel to the inner face and located between the inner face and the open end of the socket, said plates being spaced apart with their sockets facing one another,
   (b) an inner cylindrical electrode having planar ends perpendicular to the cylinder axis of the electrode,
   (c) means clamping the planar ends of the inner electrodes to and between the inner faces of such sockets,
   (d) a cylinder of non-conductive material surrounding the inner electrode with its ends abutting the shoulders of the two sockets, such tube being held in at a uniform radial distance from the inner electrode, and
   (e) a tubular outer electrode mounted on and carried by said cylinder.

2. An ozonizer comprising:
   (a) a pair of end members each formed with a plurality of sockets each configured to provide a closed, planar inner end, an open outer end and a planar shoulder between the closed inner end and the open outer end and parallel to the inner end, said plates being spaced apart with pairs of such sockets aligned with one another,
   (b) an inner cylindrical electrode for each pair of sockets having its end portions located within the sockets and formed with planar end faces perpendicular to the cylinder axis and abutting the planar inner ends of the sockets,
   (c) means clamping each such inner electrode in such position,
   (d) a cylinder of non-conductive material clamped by and between the shoulders of each pair of sockets to form, with the respective inner electrode, an annular space of uniform radial dimension,
   (e) an outer cylindrical electrode mounted on and carried by such cylinder, and
   (f) conduit means interconnecting said annular spaces for flow of air from outside the ozonizer into one of the annular spaces at one end thereof, then through each annular space in succession and out of ozonizer.

3. The ozonizer of claim 2 wherein said clamping means (c) comprises screws passing through the end plates and threaded into the ends of the inner electrodes.

4. An ozonizing system comprising:
   (a) an ozonizer unit in the form of a pair of electrodes spaced apart to provide a space for corona discharge, such unit having an air inlet and an air outlet whereby air introduced through the inlet passes through the space between the electrodes and then through the outlet,
   (b) an air dryer having an inlet communicating with the atmosphere and an outlet communicating with the inlet of the ozonizer unit, said air dryer containing a body of dessicant material,
   (c) a means connecting the dryer outlet with the ozonizer inlet,
   (d) a suction device having a water inlet, a water outlet and a suction passage connected to the ozonizer outlet whereby, when water is passed through the suction device from its inlet to its outlet, it acts to draw air by suction from the inlet of the air dryer through the dessicant material, through the outlet of the air dryer and the connection between such outlet and the ozonizer inlet, then through the space in the ozonizer between the electrodes and through the ozonizer outlet into the suction device,
   (e) hot air blower means connected to said air dryer and functioning, when actuated, to blow hot air through the dessicant material in the air dryer and through the inlet thereof to the atmosphere, and
   (f) timing and control means acting to cause a cyclic operation comprising (1) an ozonizing phase during which air is drawn in through the air dryer inlet, the dessicant material, the ozonizer unit and (2) into the suction device and a drying phase during which the suction device is inactivated, the air blower is activated and causes hot air to pass through the dessicant material to the air dryer inlet, thence to the atmosphere, thereby drying the dessicant material.

5. The ozonizer system of claim 4, including also a pump connected to the water supply to be purified and operable to supply water under pressure to said suction and mixing unit, and a filter located between the pump and suction and mixing unit.

* * * * *